(12) United States Patent
Kai

(10) Patent No.: US 12,249,089 B2
(45) Date of Patent: Mar. 11, 2025

(54) SELF-POSITION ESTIMATION APPARATUS, SELF-POSITION ESTIMATION METHOD, AND PROGRAM

(71) Applicant: NEC Corporation, Tokyo (JP)

(72) Inventor: Natsuki Kai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 335 days.

(21) Appl. No.: 17/781,430

(22) PCT Filed: Dec. 9, 2019

(86) PCT No.: PCT/JP2019/048009
§ 371 (c)(1),
(2) Date: Jun. 1, 2022

(87) PCT Pub. No.: WO2021/117079
PCT Pub. Date: Jun. 17, 2021

(65) Prior Publication Data
US 2023/0009012 A1    Jan. 12, 2023

(51) Int. Cl.
*G06T 7/70*    (2017.01)

(52) U.S. Cl.
CPC ...... *G06T 7/70* (2017.01); *G06T 2207/10028* (2013.01); *G06T 2207/30204* (2013.01);
(Continued)

(58) Field of Classification Search
CPC . G06T 2207/30244; G06T 2207/10028; G06T 2207/30252; G06T 7/246;
(Continued)

(56) References Cited

U.S. PATENT DOCUMENTS

2016/0253806 A1    9/2016 Iimura
2018/0266830 A1    9/2018 Kato et al.
(Continued)

FOREIGN PATENT DOCUMENTS

CN    105953798 B  *  9/2018   ............ G05D 1/024
JP    2007-108043 A     4/2007
(Continued)

OTHER PUBLICATIONS

International Search Report for PCT Application No. PCT/JP2019/048009, mailed on Jan. 28, 2020.

*Primary Examiner* — Ian L Lemieux

(57) ABSTRACT

A self-position estimation apparatus comprises a camera part; an environmental data storage part that stores information that changes according to the position of a mobile object on a travel route in association with the position information thereof; a first estimation part that estimates the position of mobile object from sensor data containing information that changes according to the position of mobile object and the information in the environmental data storage part; a second estimation part that estimates the self-position of mobile object from a known object included in an image inputted from the camera part; a weighting determination part that determines weighting to the position estimation results by the first estimation part and the second estimation part; and a self-position calculation part that calculates a self-position by linearly combining the self-positions estimated by the first estimation part and the second estimation part using the result from the weighting determination part.

15 Claims, 8 Drawing Sheets

(52) U.S. Cl.
CPC ............... *G06T 2207/30244* (2013.01); *G06T 2207/30252* (2013.01)

(58) Field of Classification Search
CPC ... G06T 7/73; G06T 2207/30204; G06T 7/70; G06T 7/74; G06T 2207/10021; G06T 2207/30256; G06T 2207/30264; G06T 7/254; G06T 7/292; G06T 7/521; G06T 7/579; G06T 7/593; G06T 7/80; G06T 2207/10004; G06T 2207/10012; G06T 2207/10024; G06T 2207/10048; G06T 2207/20212; G06T 2207/30248; G06T 7/0002; G06V 20/56; G06V 2201/121
See application file for complete search history.

(56) References Cited

U.S. PATENT DOCUMENTS

| | | | |
|---|---|---|---|
| 2020/0117898 A1* | 4/2020 | Tian | .................... G06F 3/04815 |
| 2020/0250854 A1* | 8/2020 | Toyoshi | ................ G06T 7/0002 |
| 2020/0279380 A1 | 9/2020 | Kaneko et al. | |
| 2020/0333789 A1 | 10/2020 | Suzuki et al. | |
| 2021/0089040 A1* | 3/2021 | Ebrahimi Afrouzi | ........................ G05D 1/0248 |
| 2021/0271257 A1* | 9/2021 | Watanabe | ................ G06F 18/24 |
| 2022/0137638 A1* | 5/2022 | Tomono | ................ G01S 7/4808 701/25 |
| 2024/0028045 A1* | 1/2024 | Haeusler | ................... G06T 7/73 |

FOREIGN PATENT DOCUMENTS

| | | |
|---|---|---|
| JP | 2011-215974 A | 10/2011 |
| JP | 2016-162013 A | 9/2016 |
| JP | 2018-081008 A | 5/2018 |
| WO | 2017/057052 A1 | 4/2017 |
| WO | 2019/053986 A1 | 3/2019 |
| WO | 2019/073772 A1 | 4/2019 |
| WO | 2019/082669 A1 | 5/2019 |
| WO | 2019/138836 A1 | 7/2019 |

\* cited by examiner

SELF-POSITION ESTIMATION APPARATUS, SELF-POSITION ESTIMATION METHOD, AND PROGRAM

TECHNICAL FIELD

This application is a National Stage Entry of PCT/JP2019/048009 filed on Dec. 9, 2019, the contents of all of which are incorporated herein by reference, in their entirety.

The present invention relates to a self-position estimation apparatus, self-position estimation method, and program.

BACKGROUND

In recent years, there has been a need to have a mobile object autonomously drive itself in areas where radio waves from a GNSS (Global Navigation Satellite System) are difficult to reach, and in order to achieve this, it is required to have the autonomous driving control part of the moving object grasp accurately its self-position. Patent Literature 1 discloses a mobile entity position estimation device that can increase the accuracy of estimating the position of a mobile entity even while traveling or if there is an error during calibration. More concretely, this position estimation device, using a first image and a second image acquired by an imaging device, determines a first movement amount by which a detection point being a same object has moved and a second movement amount by which the mobile entity has moved during the acquisition of the first image and the second image. Then, the position estimation device determines the accuracy of recognition of a detection point acquired by the imaging device using the first movement amount and the second movement amount and estimates a position of the mobile entity using the accuracy of recognition and position information of the detection point.

Patent Literature 2 discloses an information processing apparatus that identifies the position of a mobile object using the mobile object comprising a position estimation function using VSLAM (Visual SLAM) and a monitoring camera installed at a position where the moving object can be observed. Note that SLAM stands for Simultaneous Localization and Mapping. In particular, VSLAM is a technology that simultaneously estimates the three-dimensional information (mapping) of an environment and the position and orientation (localization) of a camera from an image taken by the camera.

Patent Literature 3 discloses a self-position estimation apparatus comprising a control part that controls the position of a mobile object in a direction in which many feature points corresponding to the registered feature points are detected from movement environment information acquired by the sensor when the position of the mobile object is estimated.

Patent Literature 4 discloses a self-position estimation apparatus capable of estimating the self-position of a mobile object by searching for an image similar to a current image captured by an image capturing device provided in the mobile object in a plurality of reference images linked in advance to a shooting position when self-position estimation is unsuccessful.

[Patent Literature 1]
 International Publication Number WO2019/073772
[Patent Literature 2]
 International Publication Number WO2019/138836
[Patent Literature 3]
 International Publication Number WO2019/053986
[Patent Literature 4]
 Japanese Patent Kokai Publication No. JP2016-162013A

SUMMARY

The following analysis is given by the inventor of the present invention. VSLAM used in the methods of Patent Literatures 1 to 3 has a problem that an error in the sensor or in a measurement value thereof will cause a mapping error that leads to an error in self-position estimation. In order to solve this, in Patent Literature 4, the self-position is provisionally estimated by searching the reference images prepared in advance when self-position estimation is unsuccessful.

The method of Patent Literature 4 that searches the reference images, however, also has a problem that the accuracy of measuring a self-position decreases if noise is added to the reference images. Simply put, there is a problem that even in a case where a mobile object travels in a fixed route, the amount of noise added to the acquired reference images differs between bright and dark places, reducing the position measurement accuracy. This is not specific to the method that performs similarity searching for images with respect to reference ones but it can be said that it is a common problem among schemes using environmental information for self-position estimation.

It is an object of the present invention to provide a self-position estimation apparatus, self-position estimation method, and program that can contribute to increasing the estimation accuracy in a scheme that performs self-position estimation using environmental information for self-position estimation.

According to a first aspect, there is provided a self-position estimation apparatus comprising: a camera part; an environmental data storage part that stores information that changes according to the position of a mobile object on a travel route in association with the position information thereof; a first estimation part that estimates the position of the mobile object from sensor data containing information that changes according to the position of the mobile object and the information in the environmental data storage part; a second estimation part that estimates the self-position of the mobile object from a known object included in an image inputted from the camera part; a weighting determination part that determines weighting to the position estimation results by the first estimation part and the second estimation part; and a self-position calculation part that calculates a self-position by linearly combining the self-positions estimated by the first estimation part and the second estimation part using the result from the weighting determination part.

According to a second aspect, there is provided a self-position estimation method, wherein a self-position estimation apparatus comprises: a camera part; an environmental data storage part that stores information that changes according to the position of a mobile object on a travel route in association with the position information thereof; a first estimation part that estimates the position of the mobile object from sensor data containing information that changes according to the position of the mobile object and the information in the environmental data storage part; and a second estimation part that estimates the self-position of the mobile object on the basis of a known object image included in an image inputted from the camera part, and the self-position estimation apparatus determines weighting to the position estimation results by the first estimation part and the second estimation part; and calculate a self-position by linearly combining the self-positions estimated by the first estimation part and the second estimation part using the weighting. The present method is tied to a particular machine, namely, the self-position estimation apparatus comprising the environmental data storage part and the first and the second estimation parts.

According to a third aspect, there is provided a computer program causing a computer comprising: an environmental data storage part that stores information that changes according to the position of a mobile object on a travel route in association with the position information thereof; a first estimation part that estimates the position of the mobile object from sensor data containing information that changes according to the position of the mobile object and the information in the environmental data storage part; and a second estimation part that estimates the self-position of the mobile object on the basis of a known object image included in an image inputted from the camera part, to execute: a process of determining weighting to the position estimation results by the first estimation part and the second estimation part; and a process of calculating a self-position by linearly combining the self-positions estimated by the first estimation part and the second estimation part using the weighting. The program is supplied to a computer apparatus using an input device or from the outside via a communication interface, is stored in a storage device, operates a processor according to predetermined steps or processes, is capable of displaying the processing results thereof including an intermediate state as necessary via a display device step by step, or is able to communicate with the outside via the communication interface. For instance, the computer apparatus for this purpose comprises a processor, a storage device, an input device, a communication interface and a display device, if necessary, that can typically be connected to each other by a bus. Further, this program can be stored in a computer-readable (non-transitory) storage medium.

According to the present invention, it becomes possible to contribute to increasing the estimation accuracy in a scheme that performs self-position estimation using environmental information for self-position estimation.

DESCRIPTION OF EMBODIMENTS

Figure 1:
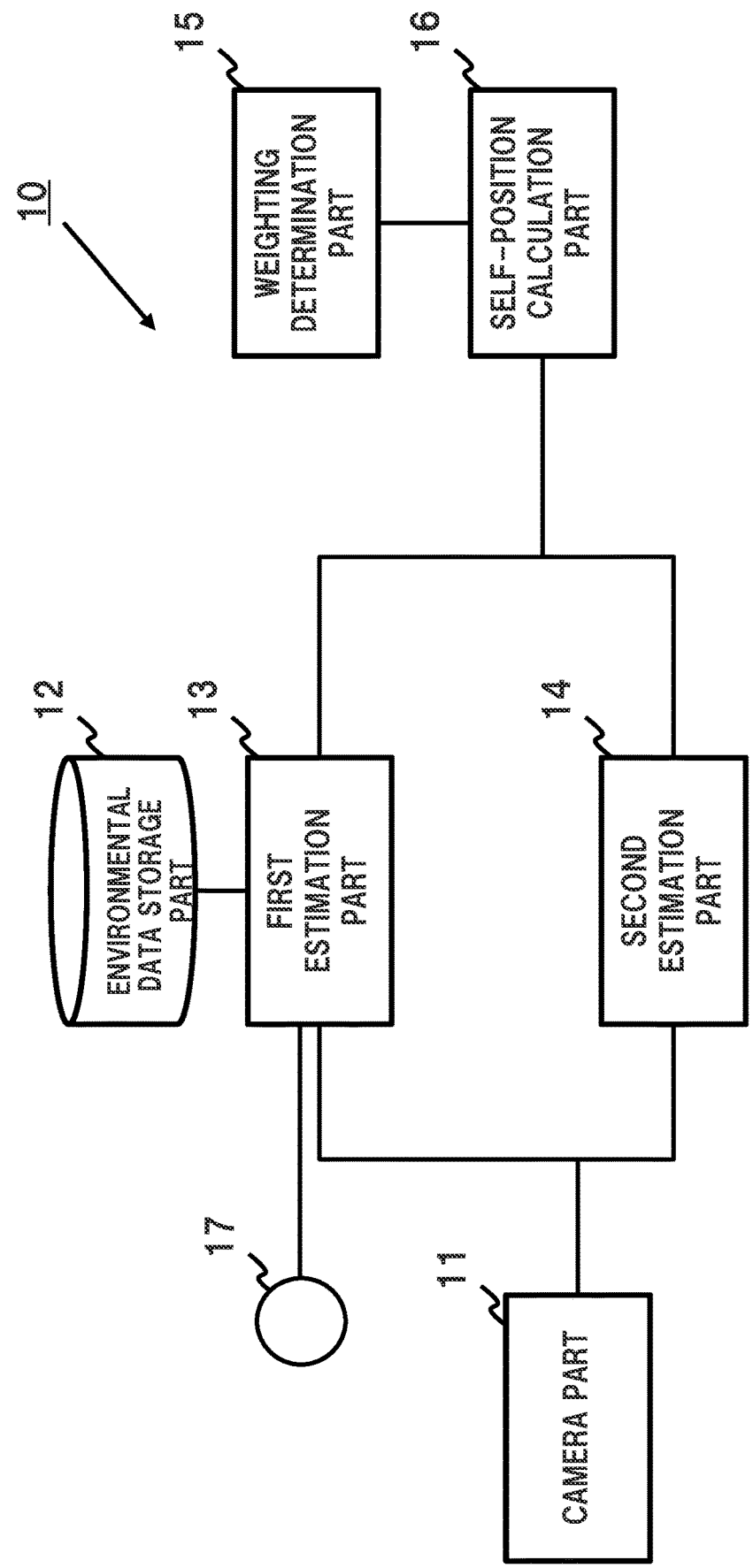
FIG. 1 is a drawing illustrating the configuration of an example embodiment of the present invention.

First, an outline of an example embodiment of the present invention will be given with reference to the drawings. It should be noted that the drawing reference signs in the outline are given to each element for convenience as an example to facilitate understanding and are not intended to limit the present invention to the illustrated aspects. Further, connection lines between blocks in the drawings referred to in the following description can be both bidirectional and unidirectional. A unidirectional arrow schematically shows the main flow of a signal (data) and does not exclude bidirectionality. A program is executed by a computer apparatus and the computer apparatus comprises, for instance, a processor, storage device, input device, communication interface, and a display device as necessary. Further, the computer apparatus is configured to be able to perform wired or wireless communication with an internal device therein or external device (including a computer) via the communication interface. Although the input/output connection points of each block in the drawings also have ports or interfaces, these are not illustrated. Further, in the following description, "A and/or B" means A or B, or A and B.

In an example embodiment, the present invention can be realized by a self-position estimation apparatus 10 comprising a camera part 11, an environmental data storage part 12, a first estimation part 13, a second estimation part 14, a weighting determination part 15, and a self-position calculation part 16, as shown in FIG. 1.

More concretely, the environmental data storage part 12 stores information that changes according to the position of a mobile object on a travel route in association with the position information thereof. The first estimation part 13 estimates the position of the mobile object from sensor data containing information that changes according to the position of the mobile object and the information in the environmental data storage part. As for this sensor data, sensor data obtained by a sensor 17 provided in the self-position estimation apparatus 10 or information acquired by the camera part 11 may be used, depending on the information held in the environmental data storage part.

The second estimation part 14 estimates the self-position of the mobile object from a known object included in an image inputted from the camera part 11.

The weighting determination part 15 determines a weighting to the position estimation results by the first estimation part 13 and the second estimation part 14.

The self-position calculation part 16 calculates a self-position by linearly combining the self-positions estimated by the first estimation part 13 and the second estimation part 14 using the result from the weighting determination part 15.

According to the self-position estimation apparatus configured as described above, it becomes possible to increase the accuracy of estimating a self-position. The reason for this is that the configuration, in which the weighting determination part 15 and the self-position calculation part 16 are added in such a way that the second estimation part 14 can compensate a decrease in the position measurement accuracy caused by environmental data, is employed.

First Example Embodiment

Figure 2:
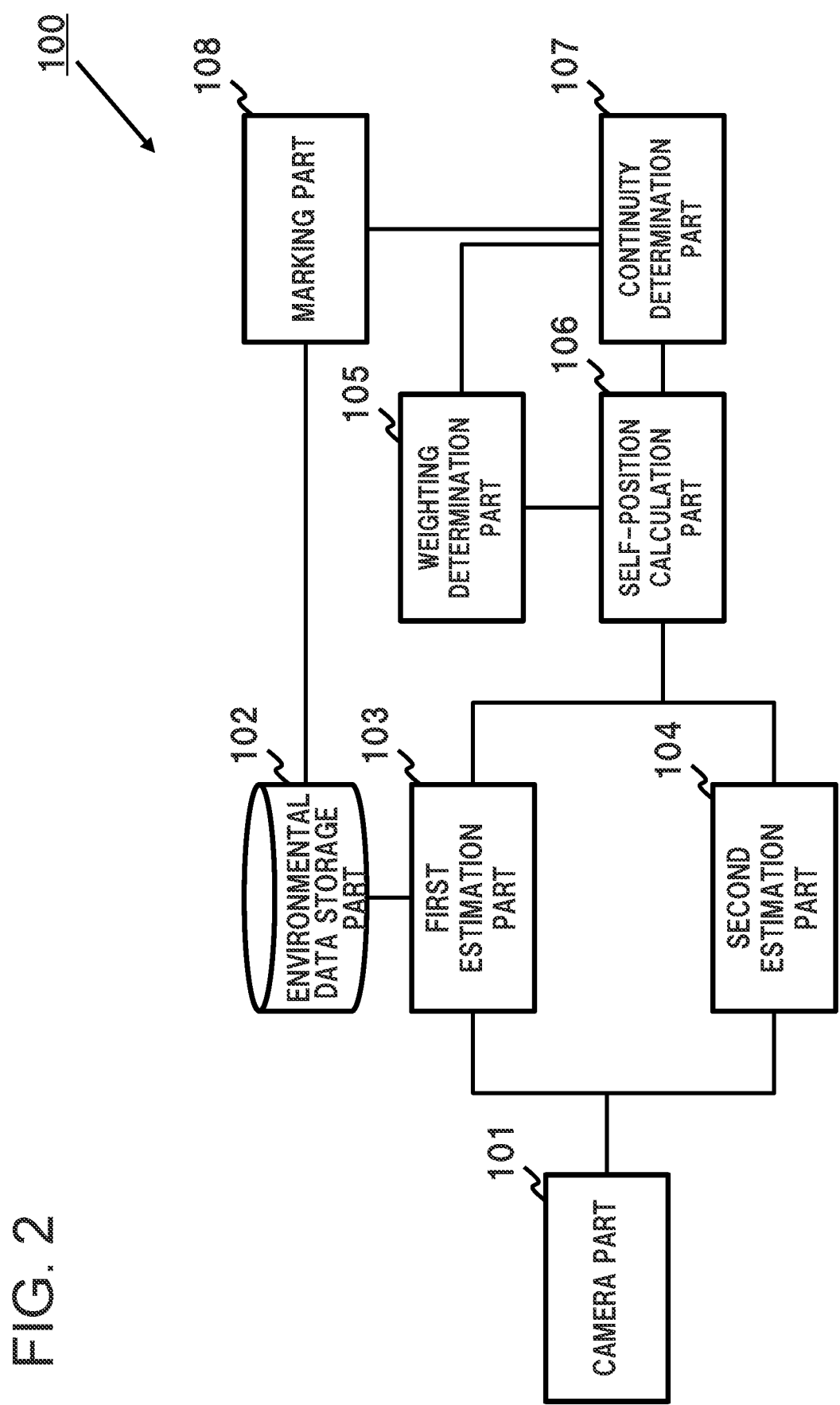
FIG. 2 is a drawing illustrating an example of the configuration of a self-position estimation apparatus according to a first example embodiment of the present invention.

Next, a first example embodiment of the present invention will be described in detail with reference to the drawings. FIG. 2 is a drawing illustrating an example of the configuration of a self-position estimation apparatus according to the first example embodiment of the present invention. With reference to FIG. 2, the self-position estimation apparatus 100 comprises a camera part 101, an environmental data storage part 102, a first estimation part 103, a second estimation part 104, a weighting determination part 105, a self-position calculation part 106, a continuity determination part 107, and a marking part 108. Further, the following description assumes that the self-position estimation apparatus 100 is installed in an automated guided vehicle (referred to as "AGV" hereinafter) capable of autonomous driving and provides position information to the automated guided vehicle.

The camera part 101 is configured to include a camera capable of shooting surrounding environment of the AGV.

The environmental data storage part 102 stores environmental data in which images shot in advance along a travel route of the AGV are associated with (linked to) the shooting positions thereof.

The first estimation part 103 identifies an image similar to an image inputted from the camera part 101 in the environmental data in the environmental data storage part 102 and estimates the position of the automated guided vehicle (AGV) on the basis of the identified result.

The second estimation part 104 estimates the position of the automated guided vehicle (AGV) from an image inputted from the camera part 101 using VSLAM. The second estimation part 104 can be configured by a function of estimating the three-dimensional self-position and self-orientation of the camera and a function of estimating the three-dimensional position of an object in a camera image. The former function (localization) is achieved by solving a PnP problem using a plurality of corresponding three-dimensional points in continuous camera images. Further, the latter function (mapping) is achieved by a function of deriving a three-dimensional position using triangulation method using corresponding points in a plurality of images in which the self-position and self-orientation of the camera are known. For instance, the second estimation part 104 described above can be configured by using the same configuration as that of the information processing apparatus in the mobile object of Patent Literature 2.

The weighting determination part 105 determines weights assigned to the position estimation results obtained by the first estimation part 103 and the second estimation part 104 using the determination result from the continuity determination part 107.

The self-position calculation part 106 linearly combines the positions estimated by the first estimation part 103 and the second estimation part 104 using the weights determined by the weighting determination part 105 and outputs the result as the position of the automated guided vehicle (AGV).

The continuity determination part 107 determines whether or not the position calculated by the self-position calculation part 106 is continuous (i.e., whether or not spatial discontinuity occurs between the positions at consecutive points in time). This continuity determination can be performed by whether or not a position at a time of t and a position at a time of t−1 fall within a predetermined range.

The marking part 108 marks the environmental information held by the environmental data storage part 102 with a predetermined marking on the basis of the determination result by the continuity determination part 107.

Figure 3:
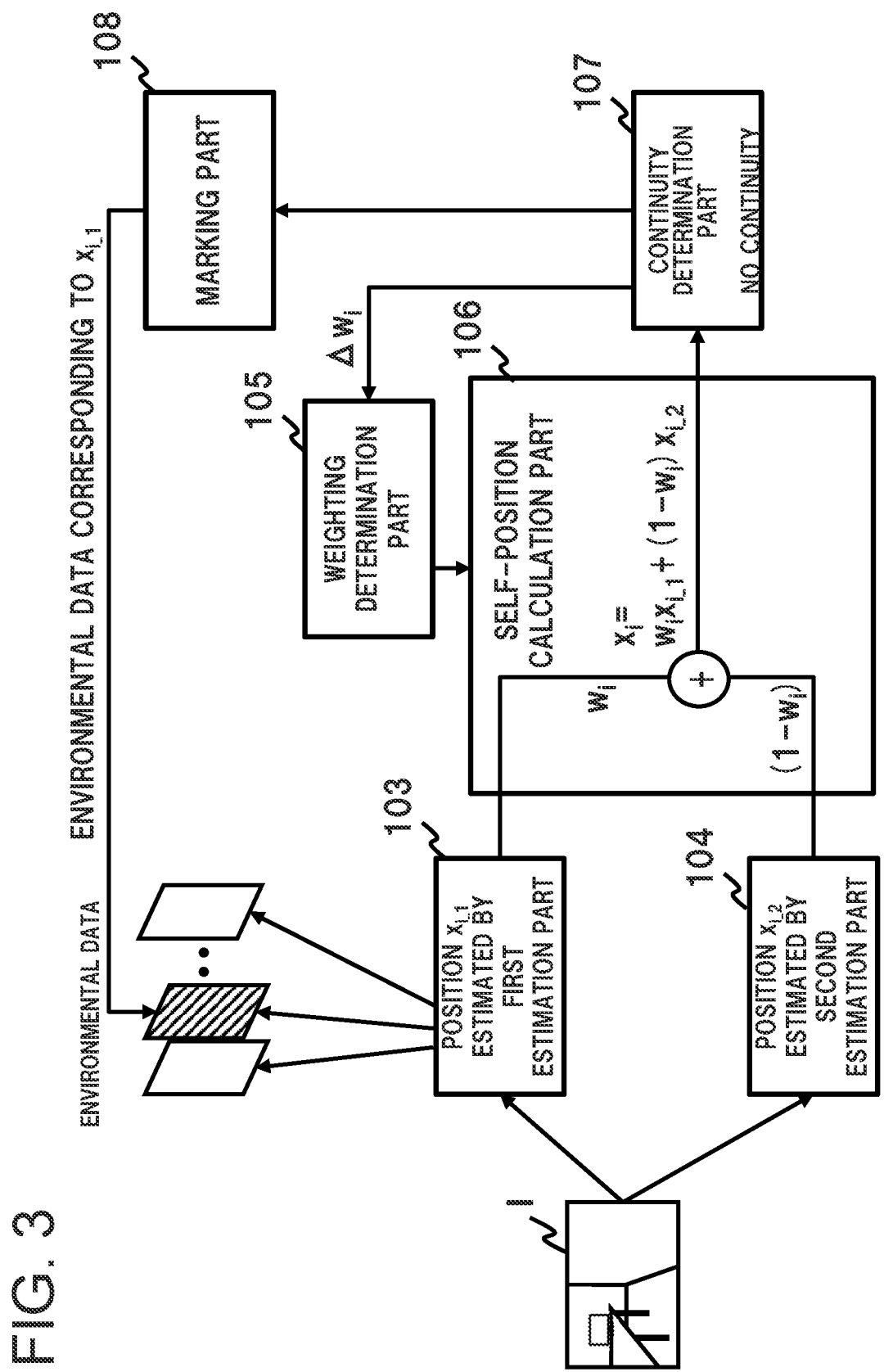
FIG. 3 is a drawing for explaining the operation of the self-position estimation apparatus according to the first example embodiment of the present invention.

Next, the operation of the present example embodiment will be described in detail with reference to the drawings. FIG. 3 is a drawing for explaining the operation of the self-position estimation apparatus according to the first example embodiment of the present invention. An image I shot by the camera part 101 is inputted to the first estimation part 103 and the second estimation part 104.

The first estimation part 103 identifies an image similar to the image inputted from the camera part 101 in the environmental data in the environmental data storage part 102 and estimates a position $x_{i\_1}$ of the automated guided vehicle (AGV) using the shooting position information associated with (linked to) the similar image.

The second estimation part 104 estimates a position $x_{i\_1}$ of the automated guided vehicle (AGV) using VSLAM on the basis of the image inputted from the camera part 101.

The position $x_{i\_1}$ estimated by the first estimation part 103 and the position $x_{i\_2}$ estimated by the second estimation part 104 are provided to the self-position calculation part 106. The self-position calculation part 106 calculates a position $x_i = w_i x_{i\_1} + (1-w_i) x_{i\_2}$ of the automated guided vehicle (AGV) by linearly combining the positions $x_{i\_1}$ and $x_{i\_2}$ using weights $w_i$, $(1-w_i)$. Here, the weight $w_i$ (where $0 <= w_i <= 1$) is a weight applied to the position $x_{i\_1}$ estimated by the first estimation part 103. If the environmental data is an image sufficient to identify a position, it is possible to set that the weight $w_i=1$ or a value close to 1. If the environmental data is not an image sufficient to identify a position, the decrease in the position estimation accuracy can be compensated by the second estimation part 104 by setting the weight $w_i$ to be smaller than 1.

The position $x_i$ of the automated guided vehicle (AGV) calculated by the self-position calculation part 106 is supplied to the continuity determination part 107. The continuity determination part 107 verifies whether or not that there is continuity of the trajectory of the automated guided vehicle (AGV) by deriving a distance between the position $x_i$ and a position $x_{i-1}$ supplied at the previous timing. The example of FIG. 3 shows a case where the continuity determination part 107 determines that there is "no continuity". In this case, the continuity determination part 107 notifies the weighting determination part 105 of a decrease value $\Delta w_i$ of the weight $w_i$. The self-position calculation part 106, which has received the notification of the decrease value $\Delta w_i$, recalculates a position $x_i'$ of the automated guided vehicle (AGV) using a weight $w_i - \Delta w_i$. The recalculated position $x_i'$ is supplied to the continuity determination part 107 and it is again verified whether or not that there is the continuity of the trajectory of the automated guided vehicle (AGV).

If it is determined that there is no continuity, the continuity determination part 107 instructs the marking part 108 to mark the corresponding environmental data. The marking part 108 which has received the instruction identifies the environmental data used when it was determined that continuity had been lost and marks it with a marking. This marking can be used to identify the target environmental data when the environmental data is modified or recreated.

Meanwhile, when it is determined that there is continuity, the continuity determination part 107 instructs the self-position calculation part 106 to output the calculated position $x_i$.

As described above, according to the present example embodiment, the position $x_i$ of the automated guided vehicle (AGV) can be calculated by assigning appropriate weights to the position estimated by the first estimation part 103 and the position estimated by the second estimation part 104, and, in addition to that, it is possible to early detect position deviation and take countermeasures. More concretely, when the continuity determination part 107 determines that there is no continuity, the weighting determination part 105 is instructed to change the weight and the marking part 108 is instructed to perform marking. As a result, it becomes possible to recalculate the position $x_i$ of the automated guided vehicle (AGV) after increasing the weight of the position $x_{i\_2}$ estimated by the second estimation part 104 and mark the causal environmental data.

Figure 4:
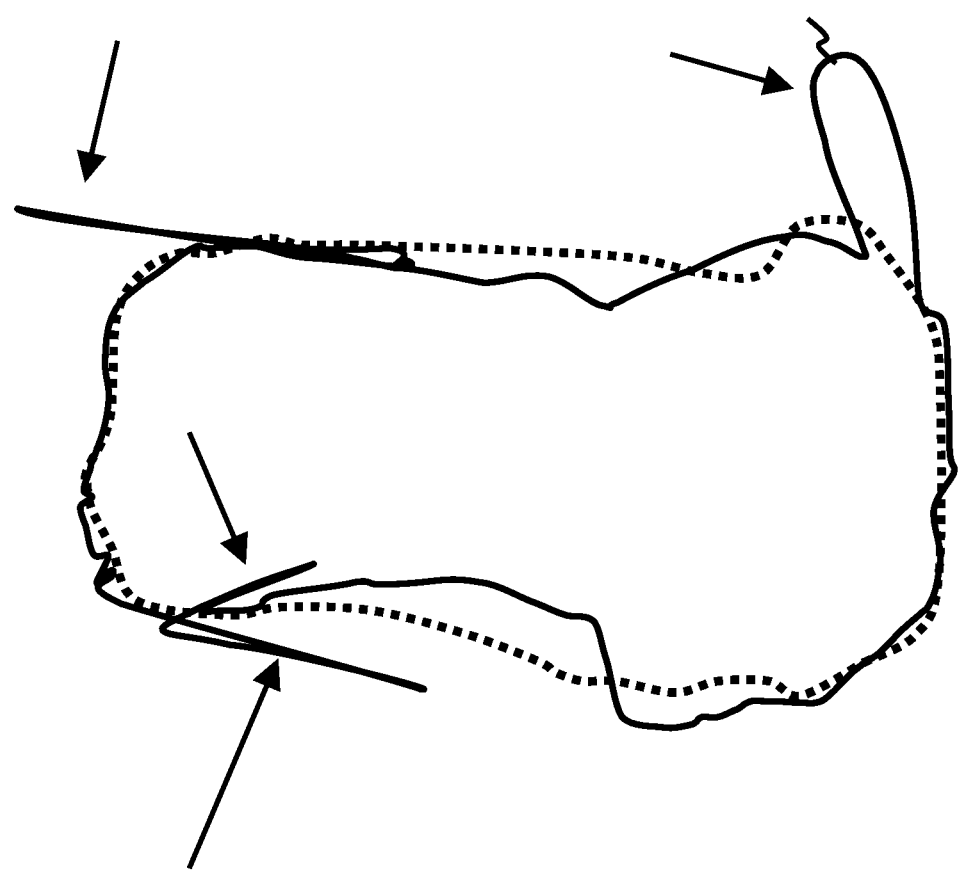
FIG. 4 is a drawing illustrating movement trajectories of a mobile object shown as a reference example.

FIG. 4 is a drawing illustrating movement trajectories of a mobile object shown as a reference example. The solid line in FIG. 4 shows a movement trajectory of the mobile object when the position thereof is estimated by using only the environmental data. In areas indicated by arrows, the movement trajectory of the mobile object deviates greatly from a prescribed route indicated by the dotted line. One of the causes of this position deviation is that the environmental data includes noise whereby the position estimation accuracy is degraded. According to the present example embodiment, when spatial discontinuity, such as the areas indicated by the arrows in FIG. 4, occurs in time-series data of the position of the mobile object, this can be addressed by correcting the position by position estimation using VSLAM and marking the causal environmental data.

Second Example Embodiment

The following describes a second example embodiment which is configured in such a way that data measured using LiDAR is used as environmental data and weights are changed using the similarity in the first estimation part. Note that LiDAR stands for Light Detection and Ranging or Laser Imaging Detection and Ranging.

Figure 5:
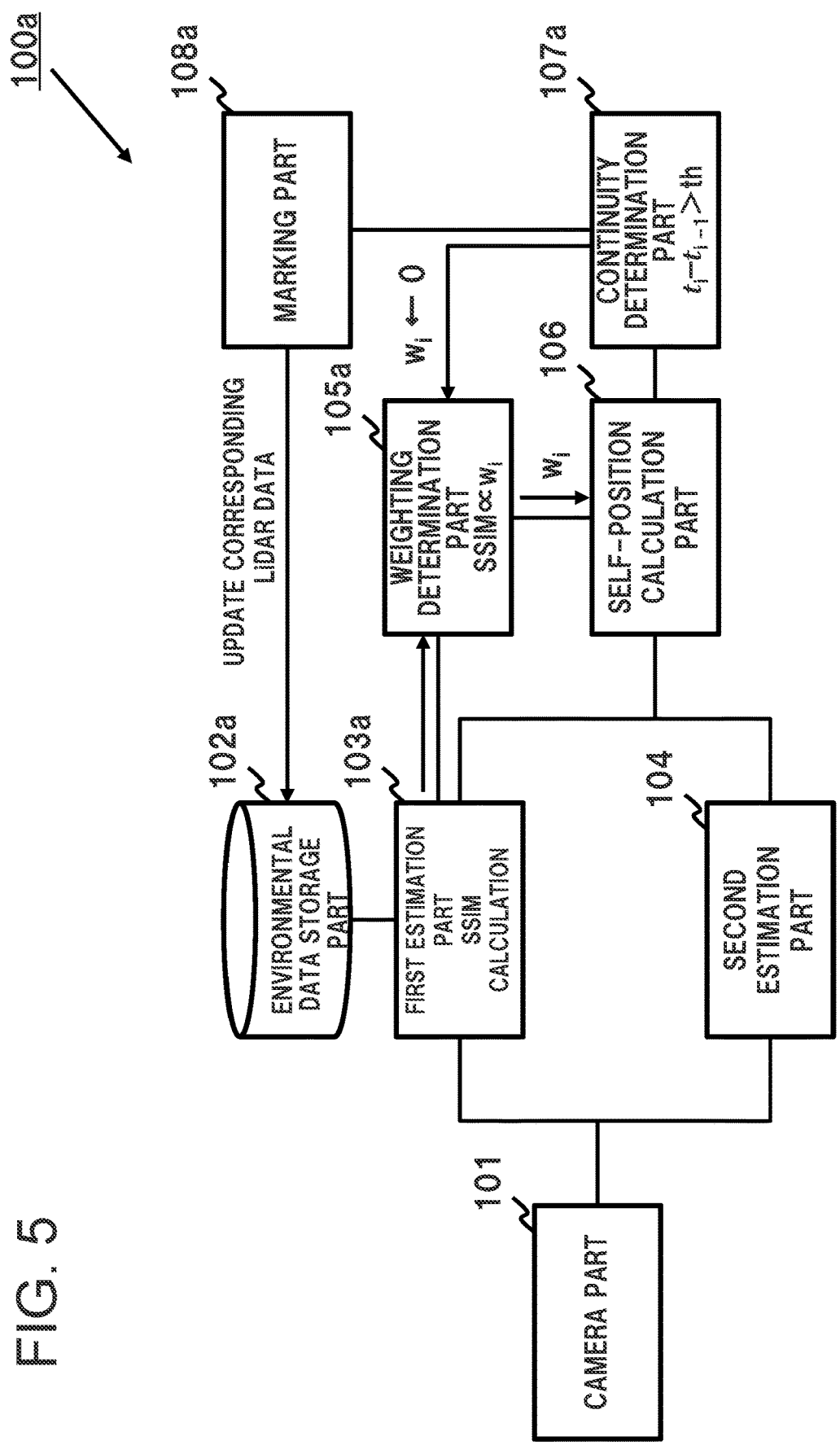
FIG. 5 is a drawing illustrating an example of the configuration of a self-position estimation apparatus according to a second example embodiment of the present invention.

FIG. 5 is a drawing illustrating an example of the configuration of a self-position estimation apparatus according to the second example embodiment of the present invention. Since the basic configuration thereof is common to that of the first example embodiment, the differences will be mainly described below.

An environmental data storage part 102a stores environmental data in which visible light images shot using LiDAR in advance along a travel route of the AGV are associated with the shooting positions where the images were captured.

A first estimation part 103a calculates the similarity between the environmental data in the environmental data storage part 102a and an image inputted from the camera part 101, identifies an image having the maximum similarity therebetween, and estimates that the identified image is the position of the automated guided vehicle (AGV). In the present example embodiment, an index called the SSIM (Structural SIMilarity) index is used as the similarity. Note that although, in the following description of the example embodiment, it is assumed that the index called the SSIM index is used as the similarity, a different similarity index, for example, such as a histogram comparison result may be used as the similarity.

Using an SSIM calculated by the first estimation part 103a, a weighting determination part 105a calculates a weight $w_i$ applied to a position $x_{i\_1}$ estimated by the first estimation part and notifies the self-position calculation part 106 thereof. Note that, as a calculation method of the weight $w_i$, it is possible to use a method of calculating the weight $w_i$ by simply multiplying the SIMM by a predetermined constant. As a result, it becomes possible to set a weight according to the reliability of the result estimated by the first estimation part 103a.

Since the operations of the second estimation part 104 and the self-position calculation part 106 are the same as those in the first example embodiment, the description thereof will be omitted.

A continuity determination part 107a determines whether or not there is spatial discontinuity by converting a position $x_i$ calculated by the self-position calculation part 106 into a self-position vector $t_i$ and comparing the difference series $D(t_i)=t_i-t_i-1$ from a self-position vector $t_i-1$ calculated previously with a threshold th. If it is determined that spatial discontinuity occurs at the position $x_i$ calculated by the self-position calculation part 106 as a result of the comparison, the continuity determination part 107a instructs a marking part 108a to mark the environmental data. Further, the continuity determination part 107a instructs the weighting determination part 105a to perform recalculation with the weight $w_i$ set to 0. As a result of this, the self-position calculation part 106 outputs a position $x_i=x_{i\_2}$. In other words, the position $x_{i\_2}$ estimated by the second estimation part 104 using VSLAM is calculated as the position $x_i$ of the automated guided vehicle (AGV).

Further, in the present example embodiment, if the environmental data identified by the first estimation part 103a according to similarity has been already marked environmental data, this environmental data may be deleted. As a result, it is possible to avoid using environmental data estimated to have a lot of noise for identifying a position in position estimation thereafter.

As described above, according to the present example embodiment, it becomes possible to increase the position estimation accuracy, in addition to the effects of the first example embodiment. The reason for this is that it is configured that the weight is set dynamically according to the reliability of the result estimated by the first estimation part 103a. Further, by avoiding using marked environmental data estimated to have a lot of noise, the degradation in the position estimation caused by this environmental data can be suppressed.

Third Example Embodiment

The following describes a third example embodiment in which depth data measured by a depth sensor is also used as the environmental data and the method for adjusting the weight $w_i$ when spatial discontinuity is detected is modified.

Figure 6:
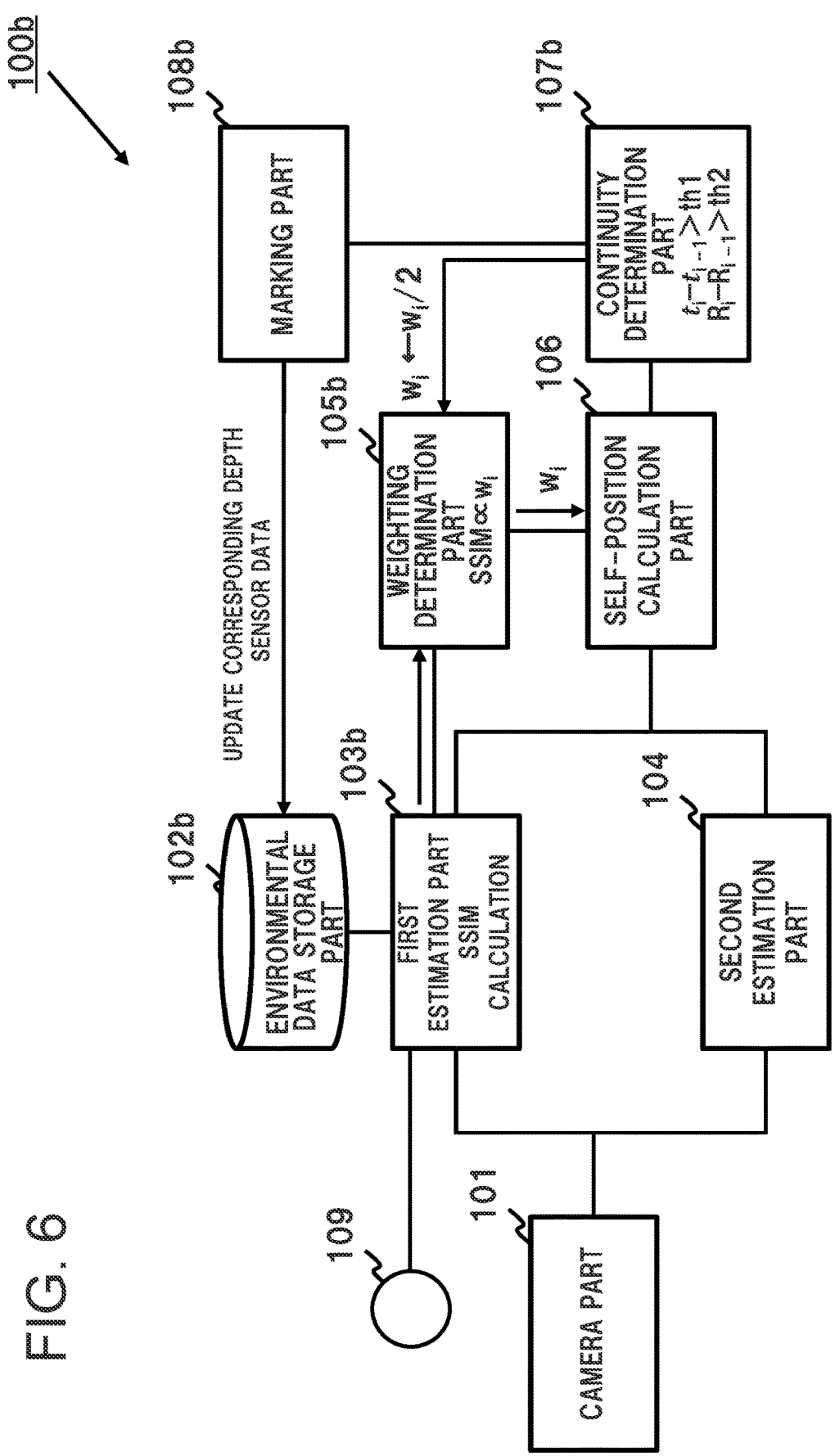
FIG. 6 is a drawing illustrating an example of the configuration of a self-position estimation apparatus according to a third example embodiment of the present invention.

FIG. 6 is a drawing illustrating an example of the configuration of a self-position estimation apparatus according to the third example embodiment of the present invention. Since the basic configuration thereof is common to that of the first example embodiment, the differences will be mainly described below.

An environmental data storage part 102b stores environmental data in which visible light images shot in advance along a travel route of the AGV as well as depth images are associated with the shooting positions.

A first estimation part 103b calculates the similarity between the environmental data in the environmental data storage part 102b and an image inputted from the camera part 101 and to identify an image having the maximum similarity therebetween. Then, the first estimation part 103b estimates that the shooting position associated with the identified image is the position of the automated guided vehicle (AGV).

Using an SSIM calculated by the first estimation part 103b, a weighting determination part 105b calculates a weight $w_i$ applied to a position estimated by the first estimation part and notifies the self-position calculation part 106 of the calculation result. Note that, in the present example embodiment, as calculation method of the weight $w_i$, it is possible to use a method for calculating the weight $w_i$ by simply multiplying the SIMM by a predetermined constant. As a result, it becomes possible to set a weight according to reliability of the results estimated by the first estimation part 103b using both the visible light images and the depth images.

Since the operations of the second estimation part 104 and the self-position calculation part 106 are the same as those in the first example embodiment, the description thereof will be omitted.

The continuity determination part 107b converts a position $x_i$ calculated by the self-position calculation part 106 into a self-position vector $t_i$. Then, the continuity determination part 107b determines whether or not spatial discontinuity is occurring by comparing the difference series $D(t_i)=t_i-t_{i-1}$ between the self-position vector $t_i$ and a self-position vector $t_{i-1}$ at the time of the previous calculation with a first threshold th1. The continuity determination part 107b further determines whether or not spatial discontinuity is occurring by comparing the difference series $D(R_i)=R_i-R_{i-1}$ between a rotation matrix $R_i$ indicating the orientation of the automated guided vehicle (AGV) and a rotation matrix $R_{i-1}$ at the time of the previous calculation with a second threshold th2.

If at least one of $D(t_i)$ and $D(R_i)$ exceeds the threshold and it is determined that spatial discontinuity is occurring at the position $x_i$ calculated by the self-position calculation part 106 as a result of this comparison, the continuity determination part 107b instructs the weighting determination part 105b to perform recalculation after the weight $w_i$ is reduced to half. As a result, the self-position calculation part 106 outputs a position $x_i=w_i \div 2 * x_{i\_1}+(1-w_i \div 2)*x_{i\_2}$. In this expression, "÷" denotes division and "*" multiplication (the same applies in the present application hereinafter). In other words, the self-position is calculated so as to put emphasis on the position estimated by the second estimation part 104 using VSLAM. Further, the continuity determination part 107b instructs a marking part 108b to mark the environmental data and change the position information of the corresponding environmental data to the current recalculated position $x_i$. As a result, from the next time onward, the position estimated by the first estimation part 103b at the same position will be changed from $x_{i\_1}$ to $x_i$.

In the present example embodiment, for marked environmental data, the PnP (Perspective-n-Point) problem may be solved again after excluding the corresponding points used to calculate the shooting position of such environmental data, and update may be performed in such a way that the calculation result may be associated with the marked environmental data stored in the environmental data storage part 102b as the shooting location thereof.

As described above, according to the present example embodiment, it becomes possible to increase the position estimation accuracy, in addition to the effects of the first example embodiment. The reason for this is that it is configured that the weight is set according to the reliability of the estimation results from both the visible light images and the depth images and that the position information of environmental data estimated to have a lot of noise is corrected. Further, by avoiding using marked environmental data estimated to have a lot of noise, the degradation in the position estimation caused by this environmental data can be suppressed.

Fourth Example Embodiment

The following describes a fourth example embodiment in which data created using SfM-MVS is used as the environmental data and the method for adjusting the weight $w_i$ when spatial discontinuity is detected is modified. Note that SfM-MVS stands for Structure from Motion/Multi-View Stereo and is a technology that creates a 3D model of the shot area using a plurality of photos shot by a camera.

Figure 7:
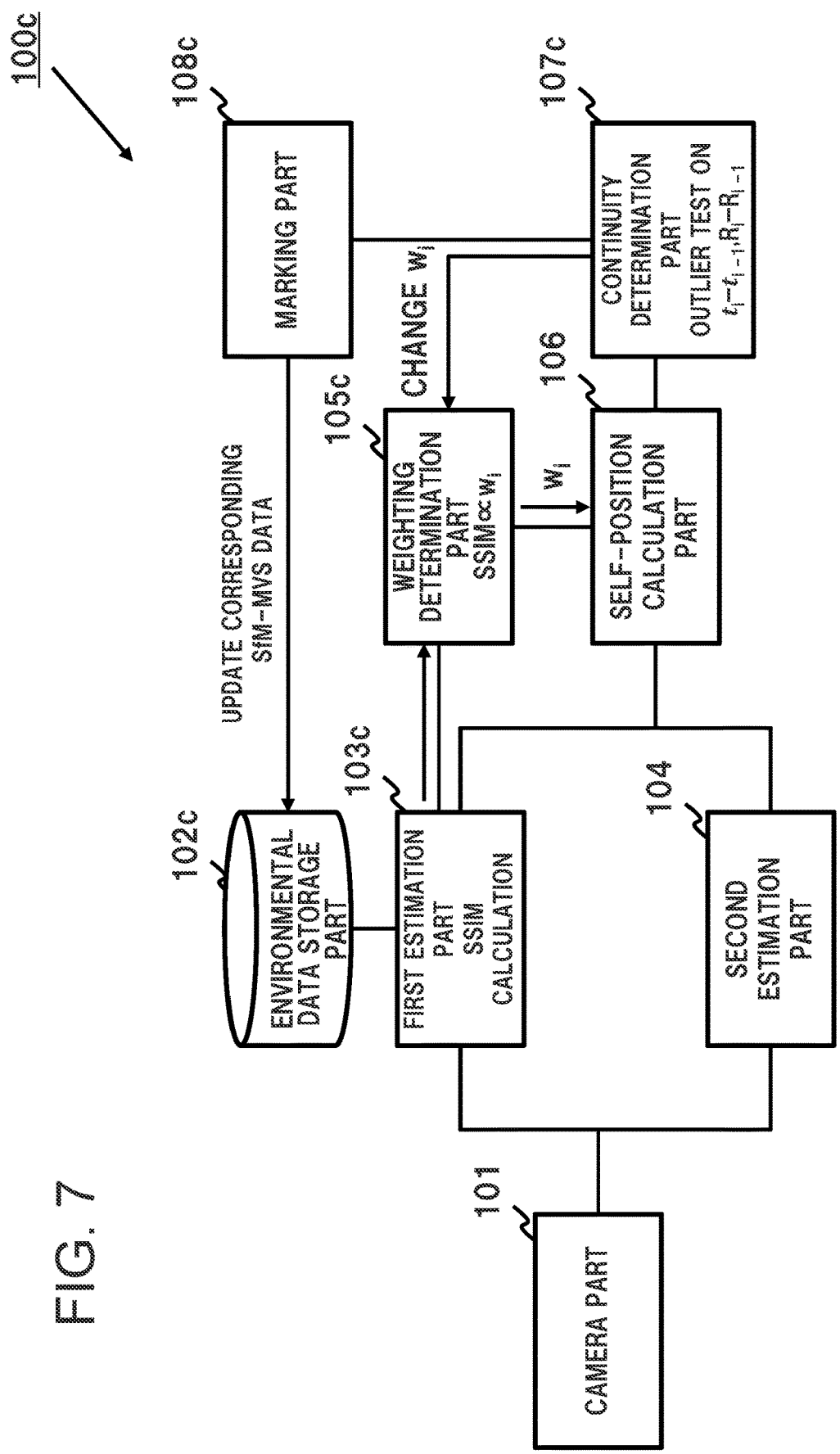
FIG. 7 is a drawing illustrating an example of the configuration of a self-position estimation apparatus according to a fourth example embodiment of the present invention.

FIG. 7 is a drawing illustrating an example of the configuration of a self-position estimation apparatus according to the fourth example embodiment of the present invention. Since the basic configuration thereof is common to that of the first example embodiment, the differences will be mainly described below.

An environmental data storage part 102c stores environmental data in which visible light images shot in advance along a travel route of the AGV as well as SfM-MVS depth images are associated with the shooting positions.

A first estimation part 103c calculates the similarity between the environmental data in the environmental data storage part 102c and an image inputted from the camera part 101 to identify an image having the maximum similarity therebetween and estimates that the identified image is the position of the automated guided vehicle (AGV).

Using an SSIM calculated by the first estimation part 103c, a weighting determination part 105c calculates a weight $w_i$ applied to a position $x_{i\_1}$ estimated by the first estimation part and notifies the self-position calculation part 106 thereof. Note that, as a calculation method of the weight $w_i$, it is possible to use a method of calculating the weight $w_i$ by simply multiplying the SIMM by a predetermined constant. As a result, it becomes possible to set a weight according to the reliability of the result estimated by the first estimation part 103c.

Since the operations of the second estimation part 104 and the self-position calculation part 106 are the same as those in the first example embodiment, the description thereof will be omitted.

A continuity determination part 107c of the present example embodiment determines whether or not spatial discontinuity is occurring by performing an outlier test on each of the difference series $D(t_i)$ and the difference series $D(R_i)$. As described above, the difference series $D(t_i)$ is configured by the difference between the present self-position vector $t_i$ and the self-position vector $t_{i-1}$ at the time of the previous calculation. Likewise, the difference series $D(R_i)$ is configured by the difference between the rotation matrix $R_i$ and the rotation matrix $R_{i-1}$ at the time of the previous calculation.

When an abnormal value is detected from at least one of $D(t_i)$ and $D(R_i)$ as a result of the outlier test, the continuity determination part 107c determines that spatial discontinuity is occurring at the position $x_i$ calculated by the self-position calculation part 106. In this case, the continuity determination part 107c instructs the weighting determination part 105c to change the weight $w_i$ according to a predetermined rule and perform recalculation. As for the predetermined rule, it is possible to employ a method in which a new weight $w_i'$ ($=w_i-\Delta w_i$) may be derived by subtracting a predetermined value $\Delta w_i$ from the weight $w_i$. As a result, the self-position calculation part 106 outputs a position $x_i=w_i'*x_{i\_1}+(1-w_i')*x_{i\_2}$. Then, the continuity determination part 107c instructs a marking part 108c to mark the environmental data and change the position information of the corresponding environmental data to the position $x_i$ recalculated this time. As a result, from the next time onward, the position estimated by the first estimation part 103c for the same position will be changed from $x_{i\_1}$ to $x_i$.

As described above, according to the present example embodiment, it becomes possible to increase the position estimation accuracy, in addition to the effects of the first example embodiment. The reason for this is that it is configured that the weight is set according to the reliability of the result estimated by the first estimation part 103c and that the position information of environmental data estimated to have a lot of noise is corrected. Further, in the present example embodiment, as described above, when it is determined that spatial discontinuity is occurring at the position $x_i$, environmental data is updated by instructing to change the weight $w_i$ to $w_i'=w_i-\Delta w_i$ according to a predetermined rule and to perform recalculation. As a result, it is possible to increase the position estimation accuracy thereafter in the present example embodiment.

While each example embodiment of the present invention has been described as above, it is to be understood that the present invention is not limited to the example embodiments above and that further modifications, replacements, and adjustments may be added without departing from the basic technical concept of the present invention. For instance, the configuration of each element and the expression of each mathematical formula shown in each drawing are examples to facilitate understanding of the present invention and are not limited to the configurations shown in the drawings.

For instance, it is described that visible light images and depth data, and so on, are used as the environmental data in the example embodiments described above, however, the environmental data is not limited to these examples. For instance, geomagnetic data mapping information that associates geomagnetic data measured in advance with the position information thereof may be used as the environmental data. In this case, the first estimation part 13/103 performs position estimation on the basis of geomagnetic data obtained by a geomagnetic sensor mounted in the mobile object. Then, the second estimation part 14/104 performs position estimation so as to complement the first estimation part 13/103.

For instance, it is described that the self-position estimation apparatus 100 is mounted in an AGV in the example embodiments described above, however, the self-position estimation apparatus 100 may be mounted to in other mobile objects such as a drone (unmanned aerial vehicle), and so on.

Further, in the example embodiments described above, it is described that the weight $w_i$ is updated by $w_i-\Delta w_i$ when the accuracy of a position when using the environmental data is problematic as an example, however, the mode of changing the weight $w_i$ is not limited thereto. For instance, it is possible to change the weight $w_i$ by multiplying the weight $w_i$ by a predetermined reduction rate $\alpha$ (where $\alpha$ is a positive value of 1 or less).

Further, although the first to the fourth example embodiments were described above, the example embodiments of the present invention are not limited thereto and the elements disclosed in the first to the fourth example embodiments can be appropriately combined to form a new modified example embodiment. For instance, one can employ a configuration in which LiDAR is used for the environmental data as in the second example embodiment and recalculation is instructed after a weight $w_i$ is reduced to half when spatial discontinuity between positions is detected as in the third example embodiment.

Figure 8:
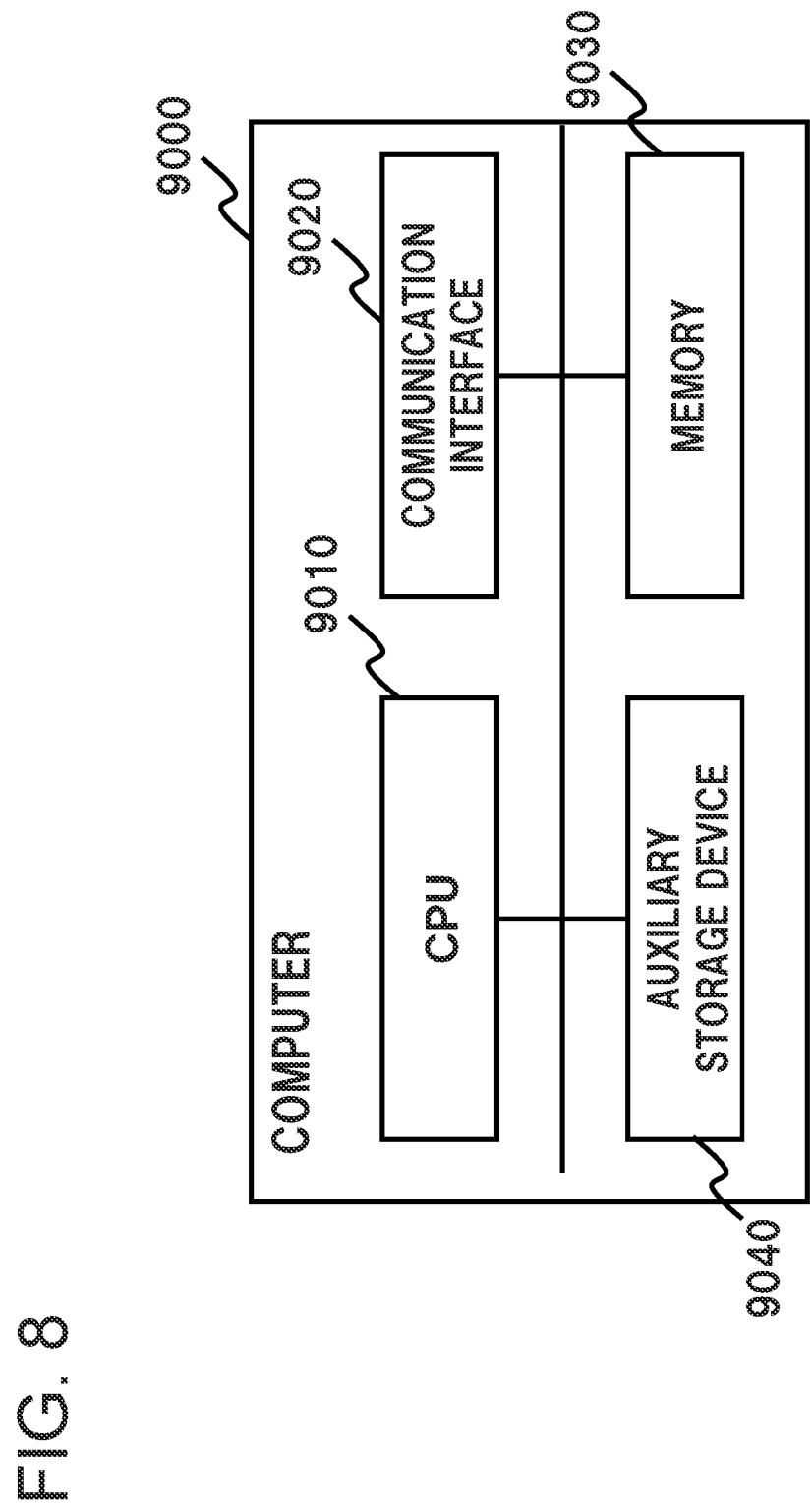
FIG. 8 is a drawing illustrating an example of the configuration of a computer constituting the self-position estimation apparatus of the present invention.

Further, the procedures described in the first to the fourth example embodiments above can be implemented by a program causing a computer (9000 in FIG. 8) that functions as the self-position estimation apparatus to realize the functions as the self-position estimation apparatus. FIG. 8 illustrates, as an example, such a computer configured to comprise a CPU (Central Processing Unit) 9010, a communication interface 9020, a memory 9030, and an auxiliary storage device 9040. In other words, the CPU 9010 in FIG. 8 executes a position estimation program and a self-position calculation program to perform updating each computation parameter held by the auxiliary storage device 9040.

That is to say, each part (each processing means or function) of the self-position estimation apparatus described in each of the first to the fourth example embodiments above can be realized by a computer program causing a processor installed in the self-position estimation apparatus to execute each of the processes described above using the hardware thereof.

Finally, preferred modes of the present invention will be summarized.

Mode 1

Refer to the Self-Position Estimation Apparatus According to the First Aspect

Mode 2

The weighting determination part of the self-position estimation apparatus described above may be configured to calculate a weight w to the position estimation result by the first estimation part on the basis of the similarity between the information in the environmental data storage part and the sensor data and set a weight to the position estimation result by the second estimation part to (1−w).

Mode 3

The self-position estimation apparatus described above may be configured to further comprise a continuity determination part that determines whether or not the self-position calculated by the self-position calculation part is continuous and a marking part that marks the information held by the environmental data storage part with a predetermined marking on the basis of the result by the continuity determination part.

Mode 4

The weighting determination part of the self-position estimation apparatus described above may be configured to change the weighting to reduce the weight with respect to the first estimation part relating to the marked information,
  the self-position calculation part may be configured to recalculate a self-position using the changed weighting, and
  the marking part may be configured to rewrite the position information of the information associated with the marked information to the recalculated position.

Mode 5

The self-position estimation apparatus described above may be configured to exclude the marked information from targets of the linear combining by the self-position calculation part when it is determined that there is no continuity at a self-position calculated using a position calculated using the marked information.

Mode 6

The self-position estimation apparatus described above may be configured in such a way that at least one type of data out of data obtained by using LiDAR, data obtained from a depth sensor, and SfM-MVS data is/are used as the information data that changes according to the position of the mobile object on a travel route.

Mode 7

Refer to the Self-Position Estimation Method According to the Second Aspect

Mode 8

Refer to the Computer Program According to the Third Aspect

Further, like Mode 1, Modes 7 and 8 can be developed into Modes 2 to 6.

Further, the disclosure of each Patent Literature cited above is incorporated herein in its entirety by reference thereto and can be used as a basis or a part of the present invention as needed. It is to be noted that it is possible to modify or adjust the example embodiments or examples within the scope of the whole disclosure of the present invention (including the Claims) and based on the basic technical concept thereof. Further, it is possible to variously combine or select (or partially remove) a wide variety of the disclosed elements (including the individual elements of the individual claims, the individual elements of the individual example embodiments or examples, and the individual elements of the individual figures) within the scope of the disclosure of the present invention. That is, the present invention of course includes any types of variations and modifications which would be done by those skilled in the art according to the whole disclosure including the Claims, and the technical concept of the present invention. Particularly, any numerical ranges disclosed herein should be interpreted that any values or subranges falling within the disclosed ranges are also concretely disclosed even without specific recital thereof. In addition, each disclosure of above cited documents and also using a part or all thereof by combining with the disclosure of the present application are regarded as being included in the disclosure of the present application, as necessary, in accordance with the intent of the present invention, as a part of the disclosure of the present invention.

REFERENCE SIGNS LIST 10, 100 self-position estimation apparatus
11, 101 camera part
12, 102, 102a, 102b, 102c environmental data storage part
13, 103, 103a, 103b, 103c first estimation part
14, 104 second estimation part
15, 105, 105a, 105b, 105c weighting determination part
16, 106 self-position calculation part
17 sensor
107, 107a, 107b, 107c continuity determination part
108, 108a, 108b, 108c marking part
9000 computer
9010 CPU
9020 communication interface
9030 memory
9040 auxiliary storage device

What is claimed is:

1. A self-position estimation apparatus comprising:
a camera part; and
at least a processor; and
a memory in circuit communication with the processor, wherein the processor is configured to execute program instructions stored in the memory to implement:
an environmental data storage part that stores information that changes according to a position of a mobile object on a travel route in association with position information thereof;
a first estimation part that estimates the position of the mobile object from sensor data containing information that changes according to the position of the mobile object and the information in the environmental data storage part;
a second estimation part that estimates the position of the mobile object on the basis of a known object image included in an image inputted from the camera part;
a weighting determination part that determines weightings for the position of the mobile object estimated by the first estimation part and the second estimation part;
a self-position calculation part that calculates the position of the mobile object by linearly combining the positions estimated by the first estimation part and the second estimation part using the weightings determined by the weighting determination part;
a continuity determination part that determines whether or not the position of the mobile object calculated by the self-position calculation part is continuous; and
a marking part that marks the information held by the environmental data storage part with a predetermined marking on the basis of the result by the continuity determination part.

2. The self-position estimation apparatus according to claim 1, wherein
the weighting determination part calculates a weight w for the position estimated by the first estimation part on the basis of a similarity between the information in the environmental data storage part and the sensor data and sets a weight for the position estimated by the second estimation part to (1−w).

3. The self-position estimation apparatus according to claim 1, wherein
the weighting determination part changes the weightings to reduce the weighting for the position estimated by the first estimation part relating to the marked information,
the self-position calculation part recalculates the position using the changed weightings, and
the marking part rewrites the position information of the information associated with the marked information to the recalculated position.

4. The self-position estimation apparatus according to claim 1, wherein
the marked information is excluded from targets of the linear combining by the self-position calculation part when it is determined that there is no continuity at the position a calculated using the marked information.

5. The self-position estimation apparatus according to claim 1, wherein at least one type of data out of data obtained by using LiDAR, data obtained from a depth sensor, and SfM-MVS data is as the information that changes according to the position of the mobile object on the travel route.

6. A self-position estimation method performed by a self-position estimation apparatus comprising:
- a camera part;
- an environmental data storage part that stores information that changes according to a position of a mobile object on a travel route in association with position information thereof;
- a first estimation part that estimates the position of the mobile object from sensor data containing information that changes according to the position of the mobile object and the information in the environmental data storage part; and
- a second estimation part that estimates the position of the mobile object on the basis of a known object image included in an image inputted from the camera part, wherein the self-position estimation method comprises:
- determining weightings for the position of the mobile object estimated by the first estimation part and the second estimation part;
- calculating the position of the mobile object by linearly combining the positions estimated by the first estimation part and the second estimation part using the weightings;
- determining whether or not the calculated position of the mobile object is continuous; and
- marking the information held by the environmental data storage part with a predetermined marking on the basis of the result of determining whether or not the calculated self-position is continuous.

7. The self-position estimation method according to claim 6, wherein calculating the weightings comprises calculating a weight w for the position estimated by the first estimation part on the basis of a similarity between the information in the environmental data storage part and the sensor data, and setting a weight for the position estimated by the second estimation part to (1−w).

8. The self-position estimation method according to claim 6, further comprising:
- changing the weightings to reduce the weighting for the position estimated by the first estimation part relating to the marked information;
- recalculating the position using the changed weightings; and
- rewriting the position information of the information associated with the marked information to the recalculated position.

9. The self-position estimation method according to claim 6, further comprising:
- excluding the marked information from targets of the linear combining by the self-position calculation part when it is determined that there is no continuity at the position calculated using the marked information.

10. The self-position estimation method according to claim 6, wherein at least one type of data out of data obtained by using LiDAR, data obtained from a depth sensor, and SfM-MVS data is used as the information that changes according to the position of the mobile object on the travel route.

11. A non-transitory computer-readable recording medium storing a program executable by a computer comprising:
- a camera part;
- an environmental data storage part that stores information that changes according to a position of a mobile object on a travel route in association with position information thereof;
- a first estimation part that estimates the position of the mobile object from sensor data containing information that changes according to the position of the mobile object and the information in the environmental data storage part; and
- a second estimation part that estimates the position of the mobile object on the basis of a known object image included in an image inputted from the camera part, wherein the program is executable by the computer to perform processing comprising:
- determining weightings for the position of the mobile object estimated by the first estimation part and the second estimation part;
- calculating the position of the mobile object by linearly combining the positions estimated by the first estimation part and the second estimation part using the weightings;
- determining whether or not the calculated position of the mobile object is continuous; and
- marking the information held by the environmental data storage part with a predetermined marking on the basis of the result of determining whether or not the calculated self-position is continuous.

12. The non-transitory computer-readable recording medium according to claim 11, wherein
- calculating the weightings comprises calculating a weight w for the position estimated by the first estimation part on the basis of a similarity between the information in the environmental data storage part and the sensor data, and
- setting for the position estimated by the second estimation part to (1−w).

13. The non-transitory computer-readable recording medium according to claim 11, wherein the processing further comprises:
- changing the weightings to reduce the weighting for the position estimated by the first estimation part relating to the marked information;
- recalculating the position using the changed weightings; and
- rewriting the position information of the information associated with the marked information to the recalculated position.

14. The non-transitory computer-readable recording medium according to claim 11, wherein the processing further comprises:
- excluding the marked information from targets of the linear combining by the self-position calculation part when it is determined that there is no continuity at the position calculated using the marked information.

15. The non-transitory computer-readable recording medium according to claim 11, wherein at least one type of data out of data obtained by using LiDAR, data obtained from a depth sensor, and SfM-MVS data is used as the information that changes according to the position of the mobile object on the travel route.

\* \* \* \* \*